(12) United States Patent
Hwang et al.

(10) Patent No.: US 6,980,713 B2
(45) Date of Patent: Dec. 27, 2005

(54) WAVELENGTH SELECTOR FOR OPTICAL APPLICATION

(75) Inventors: Yu-Wen Hwang, Hsinchu (TW); Chih-Ming Wang, Hsinchu (TW); Feng-Chiang Chao, Yonghe (TW)

(73) Assignee: Browave Corporation, Hsin-Chu (TW)

( * ) Notice: Subject to any disclaimer, the term of this patent is extended or adjusted under 35 U.S.C. 154(b) by 130 days.

(21) Appl. No.: 10/725,137

(22) Filed: Dec. 1, 2003

(65) Prior Publication Data

US 2004/0184808 A1    Sep. 23, 2004

(30) Foreign Application Priority Data

Mar. 18, 2003   (TW) ............... 92105888 A

(51) Int. Cl.[7] .............................................. G02B 6/28
(52) U.S. Cl. ............................. 385/24; 385/19; 385/39
(58) Field of Search ........................................... 385/24

(56) References Cited

U.S. PATENT DOCUMENTS

| | | | |
|---|---|---|---|
| 5,742,712 A | 4/1998 | Pan et al. ..................... | 385/18 |
| 6,192,174 B1 | 2/2001 | Lee .............................. | 385/24 |
| 6,249,625 B1 * | 6/2001 | Pan .............................. | 385/43 |
| 6,320,996 B1 | 11/2001 | Scobey et al. ................ | 385/18 |
| 6,433,924 B1 * | 8/2002 | Sommer .................... | 359/337.1 |
| 6,535,311 B1 | 3/2003 | Lindquist .................... | 359/128 |
| 6,535,668 B2 | 3/2003 | Liu et al. ..................... | 385/33 |
| 2003/0215177 A1 * | 11/2003 | Li et al. ....................... | 385/24 |

* cited by examiner

Primary Examiner—Sung Pak
(74) Attorney, Agent, or Firm—Thomas, Kayden, Horstemeyer & Risley

(57) ABSTRACT

A wavelength selector for transmitting radiation of multiple wavelengths. The wavelength selector includes a four-fiber collimator and provides a first input, first output, second input, and second output channel. The first input channel carries radiation of multiple wavelengths. The second input channel carries the radiation of a first wavelength to be added to the first input channel. The second output channel receives the radiation of a predetermined wavelength that is to be dropped. A switch member with a plurality of filters is movable among a plurality of positions. When the switch member is in a first position, the radiation carried by the first input channel reaches the first filter, and the radiation of the first wavelength carried by the second input channel reaches the second filter. The second output channel receives the radiation of a predetermined wavelength carried by the first input channel. All of the wavelengths except the predetermined wavelength in the radiation carried by the first input channel enter the first connecting channel, reaching the second filter and received by the first output channel together with the radiation of the first wavelength carried by the second input channel.

9 Claims, 9 Drawing Sheets

WAVELENGTH SELECTOR FOR OPTICAL APPLICATION

BACKGROUND OF THE INVENTION

1. Field of the Invention

The present invention relates to a wavelength selector, and in particular to a wavelength selector having a switched filtering member.

2. Description of the Related Art

As multiple forms of communication traffic continue to place an increasingly heavy burden on optical networks, innovative ways of pushing more data through existing fibers is being sought. Wave division multiplexing technology (WDM) provides a method for doubling the traffic capacity of a single optical fiber, without any additional fiber. Dense wavelength division multiplexing (DWDM) offers a viable alternative for increasing the transmission capabilities of fiber-optic networks. DWDM allows multiple streams of data to share a common communication channel by separating data streams into different wavelengths. The result is a dramatic increase in the amount of bandwidth provided by a single optical fiber. DWDM increases the channel density up to 40 separate optical wavelengths, thus significantly increasing the net fiber capacity.

For an optical network using DWDM, it is necessary to route and switch optical signals based on their wavelength to optimize data traffic usage. Dropping signal from and adding signals back to the optical network is a rudimentary building block for an optical network architecture. Devices which provide such functionality in conventional optical networks are called Add-Drop modules (ADMs).

The conventional wavelength selector typically has internally disposed switches. When a node fails, the switches are toggled to establish an express path connecting the input port and the output port of the node. Thus, the incoming light stream can flow through the node without interruption.

In FIGS. 1A and 1B, the conventional wavelength selector 100 having a switch 160 and an Add-Drop module is connected to an optical network, forming a node thereof, through four ports, which are named as an input port 101, output port 102, add port 103, and drop port 104. The conventional Add-Drop module includes the add port 103, the drop port 104, a connecting path 105 and two Add-Drop filers 140 and 150, which have a wavelength selectivity of a predetermined wavelength $\lambda_1$ or $\lambda_1'$.

The switch 160 of the conventional wavelength selector 100 can alter the light path of inserted light streams. When the wavelength selector 100 functions properly, or is in a "Bar" state, the switch 160 connects the path 161 and the path 162. The input port 101 and the output port 102 are individually connected to the Add-Drop filters 140 and 150, as shown in FIG. 1A. Four wavelengths $\lambda_1$, $\lambda_2$, $\lambda_3$, and $\lambda_4$ pass through the input port 101 and arrive at the filter 140 through the path 161. A predetermined wavelength $\lambda_1$ passes through the filter and enters the drop port 104 and forms a dropped signal. The remaining wavelengths $\lambda_2$, $\lambda_3$ and $\lambda_4$ are reflected by the filter 140, passing through the connecting path 105 and are again reflected by the filter 150. The three wavelengths $\lambda_2$, $\lambda_3$, $\lambda_4$ are then directed to the output port through the path 162. Meanwhile, a new data signal in the same wavelength $\lambda_1'$ transmitted from the add port 103 is added back to the network through the add port 103 and filter 150 and is introduced at output port 102.

When the wavelength selector 100 fails, or is in a "Cross" state, the switch 160 connects the path 163 and the path 164. The input port 101 is connected to the output port 102. The four wavelengths $\lambda_1$, $\lambda_2$, $\lambda_3$, and $\lambda_4$ are sent to the path 163 and return directly to the output port. The data signal of the wavelength $\lambda_1'$ added from the add port passes through the filter 150, enters the path 164, and is directed to the drop port through the filter 140. In the "Cross" state, the conventional wavelength selector can maintain the data transmission between the input and output port 101 and 102 without interruption caused by Add-Drop module failure from the.

U.S. Pat. No. 6,192,174 discloses a wavelength selector, which integrates the Add-Drop module with the optical switch. In FIGS. 2A and 2B, four channels are employed in the wavelength selector 200, input channels 201, 203, and output channels 202, 204. Each channel may include an optical fiber, with two filters individually disposed on the collimators of the input channel 203 and the output channel 204. When the wavelength selector 200 is in the "Bar" state as shown in FIG. 2B and four wavelengths $\lambda_1$, $\lambda_2$, $\lambda_3$ and $\lambda_4$ carried along the input port 201 arrive at the filter 240, the filter 240 passes the wavelength $\lambda 1$, which is directed to the output port 204 through the collimator 214. The three remaining wavelengths $\lambda 2$, $\lambda 3$, and $\pm 4$ are reflected into a connecting channel 205 of the dual-fiber collimator 211 by the filter 240, entering another the dual-fiber collimator 212. The collimated beam is reflected again by the filter 250, re-enters the collimator 212, and is directed to the output port 202. At the same time, the data stream in the same wavelength $\lambda_1'$ carried by the add port 203 passes through the collimator 213 and the filter 250, directed to the output port 202 through the collimator 212.

In FIG. 2B, when the wavelength selector 200 is in a "Cross" state, a prism 260 is inserted between the collimators 211~214 to redirect the optical paths. All of the wavelengths $\lambda_1$, $\lambda_2$, $\lambda_3$ and $\lambda_4$ pass through the input port 201, the collimator 211, the prism 260 and the collimator 212, and returns directly to the network through the output port 202. Meanwhile, the wavelength $\lambda_1'$ added from the add port 203 passes through the filter 250, the prism 260 and the filter 240, and is output from the drop port 204. Thus, this wavelength selector 200 completes the add-drop functions of a conventional Add-Drop module.

U.S. Pat. No. 6,192,174 discloses another wavelength selector as shown in FIGS. 3A and 3B. Four single-fiber collimators are aligned with each other. A switch member having a mirror and a filter with a wavelength selecting mechanism for predetermined wavelengths. In FIG. 3A, when the wavelength selector 300 is in the "Bar" state, four wavelengths $\lambda_1$, $\lambda_2$, $\lambda_3$ and $\lambda_4$ carried along the input port 301 arrive at the filter 342 on the switch member 340, the filter 342 passes the wavelength $\lambda 1$, which is directed to the drop port 304 through the collimator 314. The three remaining wavelengths $\lambda 2$, $\lambda 3$, and $\lambda 4$ are reflected into the collimator 312 and directed to the output port 302. Meanwhile, the data stream in the same wavelength $\lambda_1'$ carried by the add port 303 passes through the collimator 313 and the filter 342 on the switch, and is directed to the output port 302 through the collimator 312.

In FIG. 3B, when the wavelength selector 300 is in a "Cross" state, all of the wavelengths $\lambda_1$, $\lambda_2$, $\lambda_3$ and $\lambda_4$ that pass through the input port 201 are reflected by the mirror 341 into the collimator 312 and directed to the output port 302. At the same time, the wavelength $\lambda_1'$ added from the add port 303 is reflected by the mirror 341 and is output from the drop port 304.

In FIG. 3A, the wavelength selector 300 replaces the prism 260 in FIG. 2A with a switch member 340 having a wavelength selecting filter 342 and a mirror 341. The quality of the "Bar" State wavelength isolation for $\lambda_1$ of the data streams output from the output port 302 is worse than that of the wavelength selector 200 in FIG. 2A because the data streams of the remaining wavelengths $\lambda_2$, $\lambda_3$ and $\lambda_4$ only pass through the wavelength-selecting filter once. The residual radiation of the wavelength $\lambda_1$ may jam the added data stream and cause errors. To ensure quality, the filter must have higher wavelength isolation property, which may greatly increase the fabrication cost of the wavelength selector.

SUMMARY OF THE INVENTION

Accordingly, an object of the invention is to provide a wavelength selector with fewer elements and better wavelength isolation properties to reduce cost and improve quality thereof.

The present invention provides a wavelength selector for transmitting radiation of multiple wavelengths. The wavelength selector includes a first input and first output channel for carrying multiple wavelength signals, a second input, and second output channel for carrying a first wavelength signal, a first connecting channel, and a switch member. The switch member has a plurality of filters and may be switched to a number of positions. When the switch member is in a first position, the radiation of the first input channel reaches the first filter, and the radiation of the first wavelength carried by the second input channel reaches the second filter. The second output channel receives the radiation of a predetermined wavelength carried by the first input channel. All of the wavelengths except the predetermined wavelength in the radiation carried by the first input channel enter the first connecting channel, reach the second filter, and are received by the first output channel together with the radiation of the first wavelength carried by the second input channel.

In a preferred embodiment, the predetermined wavelength and the first wavelength are in the same waveband, but are different from the wavebands of the other wavelengths in the radiation carried by the first input channel.

Moreover, the first input channel is substantially aligned with the second output channel and the first connecting channel. The second input channel is substantially aligned with the first output channel and the second connecting channel.

In a preferred embodiment, the first filter and the second filter pass the radiation of the first and the predetermined wavelength and reflect all of the wavelengths except for the radiation of the first and the predetermined wavelength. Moreover, the switch member has two radiation reflective portions away from the filters. When the switch member is in a second position, the radiation carried by the first input channel is reflected into the first connecting channel by a first radiation reflective portion. The radiation passing through the first connecting channel reaches a second radiation reflective portion, reflected again into the first output channel.

Furthermore, the wavelength selector of this embodiment has a second connecting channel. When the switch member is in the second position, the radiation of the first wavelength carried by the second input channel is reflected into the second connecting channel by the second radiation reflective portion. The radiation passing through the second connecting channel reaches the first radiation reflective portion, and is reflected into second output channel. The second connecting channel is substantially aligned with the second input channel and the second output channel.

In another preferred embodiment, the wavelength selector the first filter and the second filter can reflect the radiation of the first and the predetermined wavelength and pass all of the wavelengths except for the radiation of the first and the predetermined wavelength. Moreover, the switch member has two first radiation transmissive portions. When the switch member is in a second position, the radiation carried by the first input channel passes through a first radiation transmissive portion, entering the first connecting channel, and passes through a second radiation transmissive portion again, and is received by the first output channel.

Furthermore, the wavelength selector of this embodiment has a second connecting channel. When the switch member is in a second position, the radiation carried by the second input channel passes through the second radiation transmissive portion, entering the second connecting channel, and again passes through the second radiation transmissive portion and is received by the second output channel. The second connecting channel is substantially aligned with the second input channel and the second output channel.

Additionally, the first input, the first output, and the first connecting channel are formed by a four-fiber collimator or two dual-fibers collimators. The second input, the second output, and the second connecting channel are formed by another four-fiber collimator or another two dual-fiber collimators.

In another preferred embodiment, the first and second filter can become a single filter by modifying the coupling angle and the relative position of the inlet and outlet of the first and second connecting channels to reduce difficulty in fabricating the switch member. Moreover, the switch member has a plurality of filters, which can selectively reflect radiation of different wavelengths for different requirements.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1A:
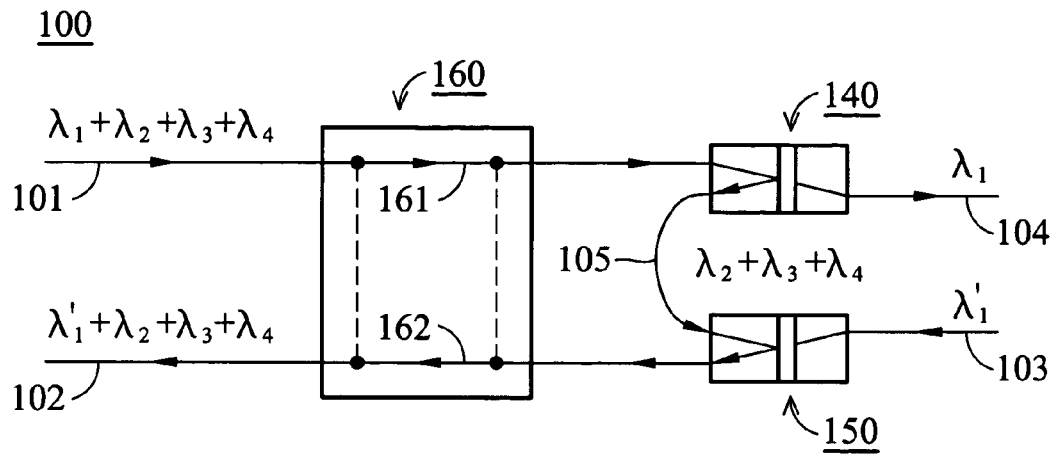
FIG. 1A is a schematic diagram of a conventional wavelength selector with an individual Add-Drop module in the "Bar" state as referenced in the Prior Art.
Figure 1B:
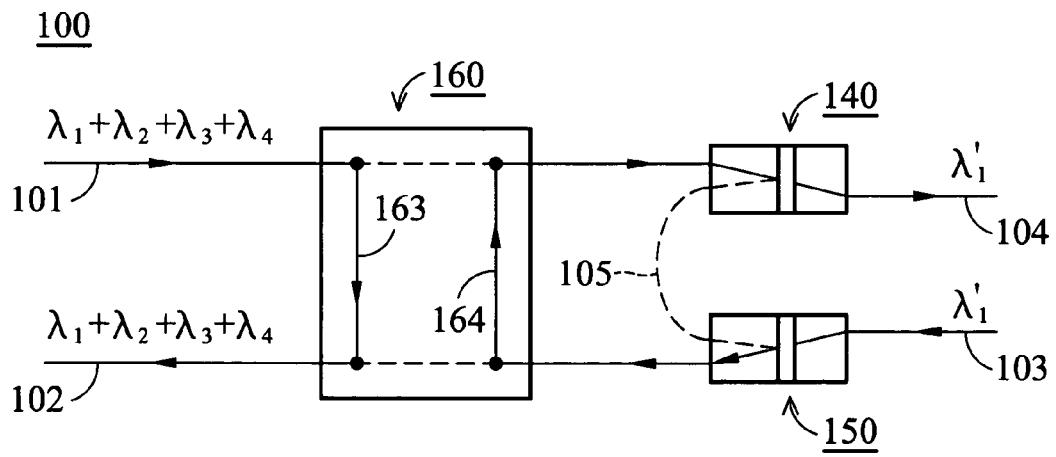
FIG. 1B is a schematic diagram of the selector in FIG. 1A in the "Cross" state.
Figure 2A:
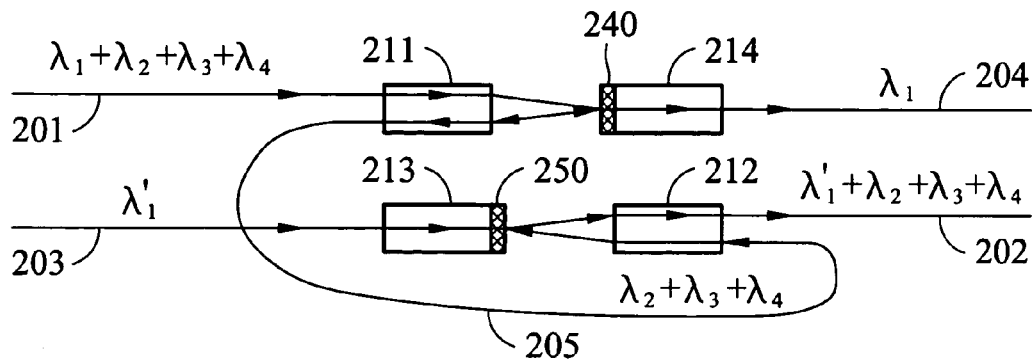
FIG. 2A is a schematic diagram of another conventional wavelength selector in the "Bar" state as referenced in the Prior Art.
Figure 2B:
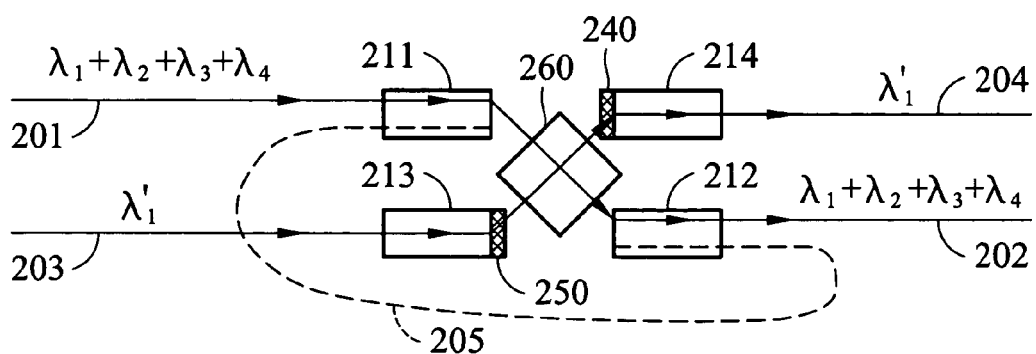
FIG. 2B is a schematic diagram of the selector in FIG. 2A in the "Cross" state.
Figure 3A:
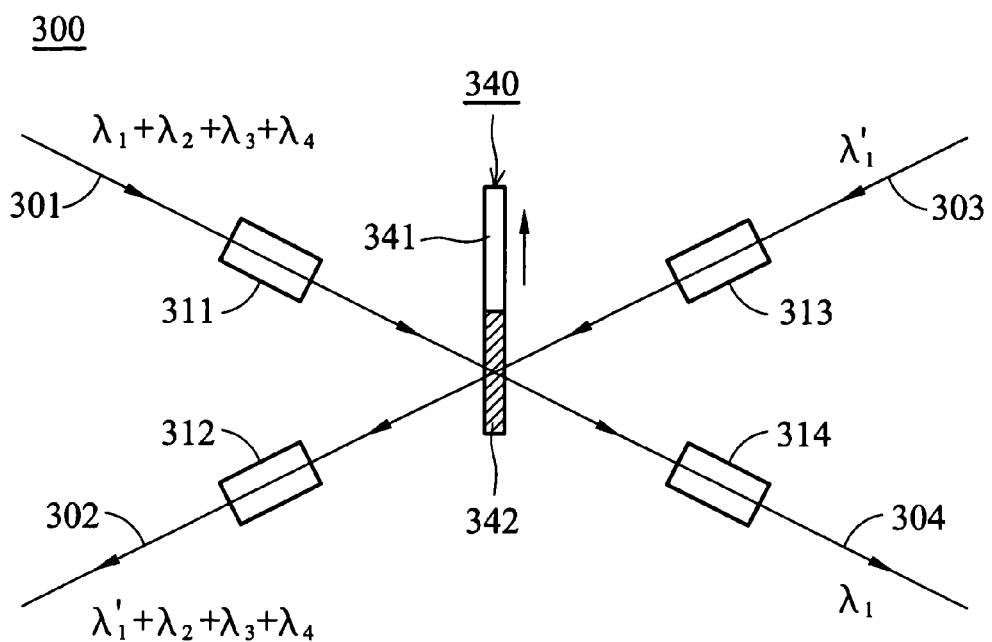
FIG. 3A is a schematic diagram of another conventional wavelength selector in the "Bar" state as referenced in the Prior Art.
Figure 3B:
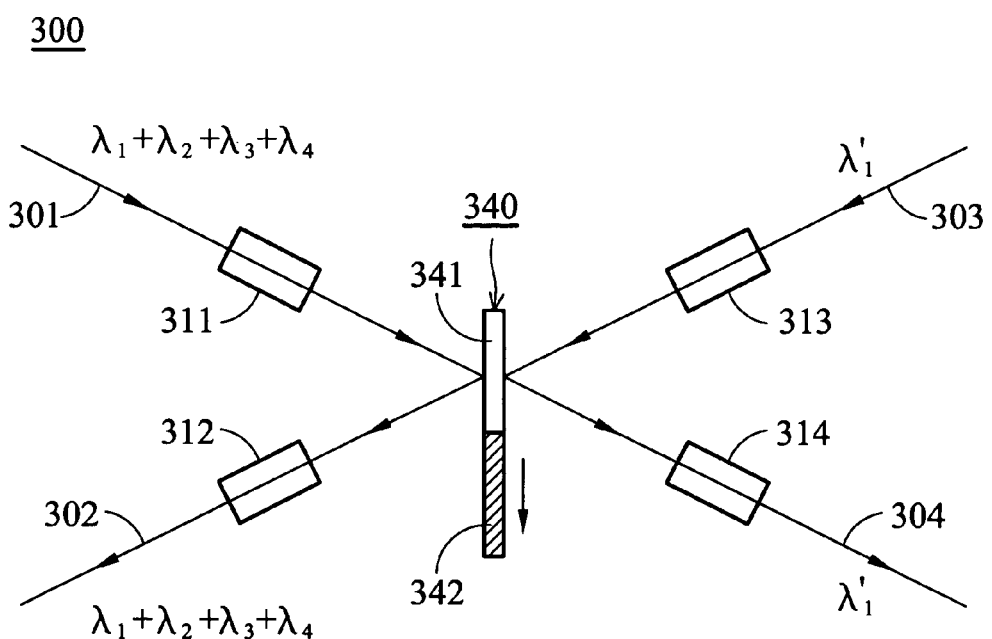
FIG. 3B is a schematic diagram of the selector in FIG. 3A in the "Cross" state.
Figure 4A:
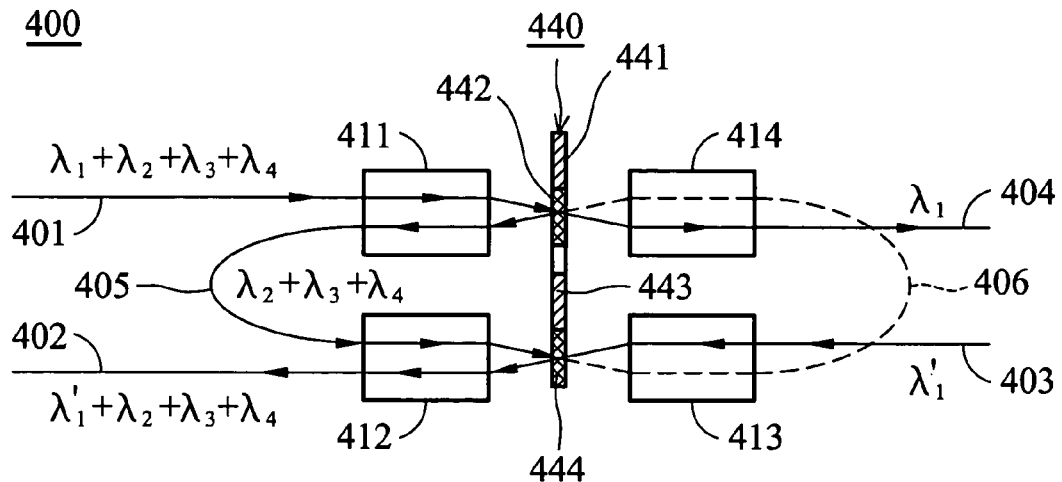
FIG. 4A is a schematic diagram of a wavelength selector in the "Bar" state of the fist embodiment of the invention.
Figure 4B:
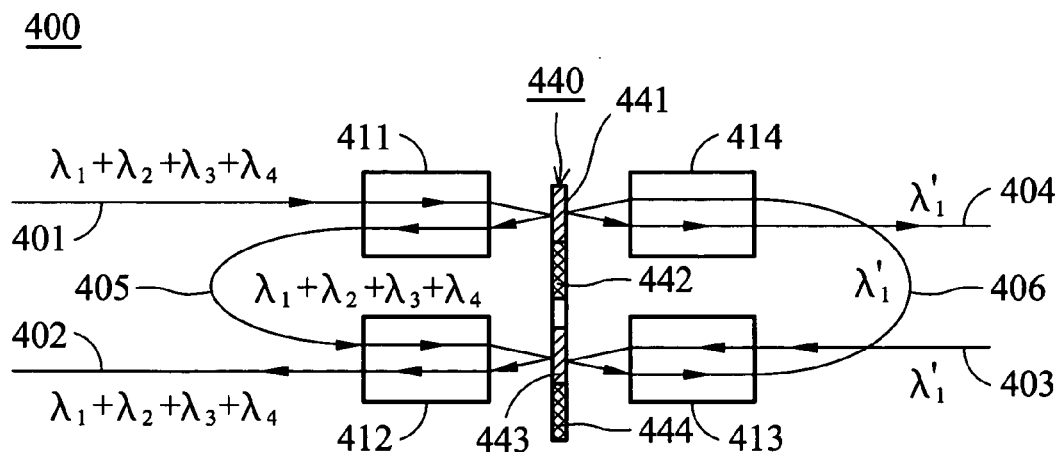
FIG. 4B is a schematic diagram of the selector in FIG. 4A in the "Cross" state.

In order to enhance the wavelength isolation property, reduce cost and simplify the structure of the wavelength selector, the present invention provides a new wavelength selector as shown in FIGS. 4A and 4B.

The wavelength selector 400 includes four dual-fiber collimators 411~414. One fiber of each collimator 411~414 forms a data transmission channel, including a first input channel 401 (input port) and a first output channel 402 (output port) carrying radiation of multiple wavelengths $\lambda 1 \sim \lambda 4$ for example, and a second input channel 403 (add port) and a second output port 404 (drop port) carrying radiation of a first wavelength $\lambda 1'$. The other fibers of collimators 411, 412 are fused together, forming a first connecting channel 405. As well, the other fibers of collimators 413, 414 are also fused together, forming a second connecting channel 406. The first input channel 401 is substantially aligned with the second output channel 404 and the first connecting channel 405 by gradient index (GRIN) lenses. The second input channel 403 is substantially aligned with the first output channel 402 and the second connecting channel 406 by GRIN lenses.

The wavelength selector 400 has a switch member 440 with two bandpass filters 442, 444 and two mirrors 441, 443. The switch member 440 is disposed between the channels 401~404 and movable between two predetermined positions to redirect the optical paths.

In the first embodiment, the switch member 440 is a small glass plate driven, for example, by a step motor. The first filter 442 and the second filter 444 are the regions on the glass plate having a wavelength-selecting layer to pass the radiation of the first and the predetermined wavelength $\lambda_{1'}$, $\lambda_1$ and reflect all of the wavelengths $\lambda_2 \sim \lambda_4$ except for the radiation of the first and the predetermined wavelength $\lambda_1'$, $\lambda_1$. In this case, the predetermined wavelength $\lambda_1$ and the first wavelength $\lambda_1'$ are in the same waveband but different from the wavebands of the other wavelengths $\lambda_2$, $\lambda_3$ and $\lambda_4$.

The first mirror 441 and the second mirror 443 are the regions on the glass plate coated with high-efficiency reflecting materials to reflect any introduced radiation from the input channels 401, 403.

In FIG. 4A, when the switch member 440 is in a second position, the wavelength selector 400 is in the "Bar" state. The wavelengths $\lambda_1$, $\lambda_2$, $\lambda_3$ and $\lambda_4$ carried by the input port 401 reaches the first filter 442, and the radiation of the first wavelength $\lambda_1'$ carried by the add port 403 reaches the second filter 444. The wavelength $\lambda_1$ passes through the first filter 442, and is coupled to the drop port 404 by the collimator 414, and reflects all of the remaining wavelengths $\lambda_2$, $\lambda_3$, and $\lambda_4$. The three reflected wavelengths $\lambda_2$, $\lambda_3$, and $\lambda_4$ are transmitted inside the first connecting channel 405 to the collimator 412 and reach the second filter 444, which has the same spectrum characteristic as the first filter 442. At the same time, the second filter 444 passes the added first wavelength $\lambda_1'$ carried by the add port 403 through the collimator 413 and reflects the three remaining wavelengths $\lambda_2$, $\lambda_3$, and $\lambda_4$. Thus, the signals of the first wavelength $\lambda_1'$ and the three reflected wavelengths $\lambda_2$, $\lambda_3$, and $\lambda_4$ are directed to the output port 402 by the collimator 412.

In FIG. 4B, when the switch member 440 is in a first position, the wavelength selector 400 is in the "Cross" state. The input port 401 carries four wavelengths $\lambda_1$, $\lambda_2$, $\lambda_3$, and $\lambda_4$, which are collimated by the GRIN lens of the collimator 411. The wavelengths $\lambda_1$, $\lambda_2$, $\lambda_3$, and $\lambda_4$ are reflected by the first mirror 441 and coupled to the collimator 411 again. The reflected wavelengths $\lambda_1$, $\lambda_2$, $\lambda_3$, and $\lambda_4$ are transmitted through the first connecting channel 405 and collimated by the GRIN lens of the collimator 412. The collimated beam is reflected again by the second mirror 443 and directed to the output port 402 through the collimator 412. Meanwhile, radiation in the first wavelength $\lambda_1'$ from the add port 403 is also reflected by the second mirror 443 into the second connecting channel 406, or a second express path, and then collimated by the GRIN lens of the collimator 414. The collimated beam of the first wavelength $\lambda_1'$ is reflected again and coupled to the drop port 404 by the collimator 414. Therefore, the wavelength selector 400 in the first embodiment of the present invention has completed the Add-Drop functions of the conventional Add-Drop module.

In FIG. 4A, because the input data streams carried by the input port 401 of the wavelength selector 400 are reflected twice by two bandpass filters 442 and 444, the residual radiation of the wavelength $\lambda_1$ in the output data streams can be decreased to an amount lower than 1%. Accordingly, the wavelength isolation provided by the wavelength selector 400 in the first embodiment improves upon the conventional art. Moreover, the wavelength selector 400 has simple configurations and can be assembled easily, such that the cost is reduced.

Furthermore, when the network connected to the add port 403 and the drop port 404 fails, or data streams from the add port 403 is not critical; the second connecting channel 406 can be eliminated. The dual collimators 413, 414 can be replaced with two single-fiber collimators to further reduce costs.

Second Embodiment

Figure 5A:
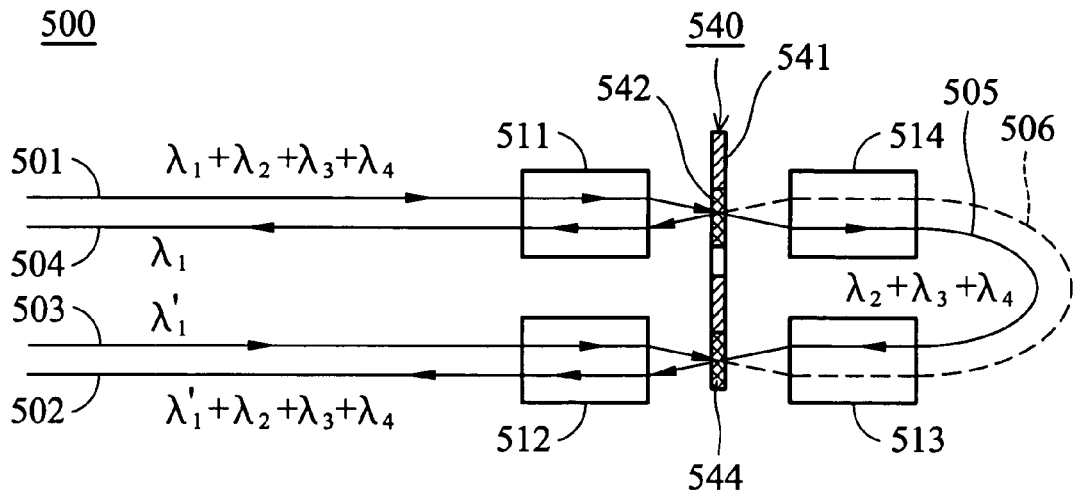
FIG. 5A is a schematic diagram of a wavelength selector in the "Bar" state of the second embodiment of the invention.
Figure 5B:
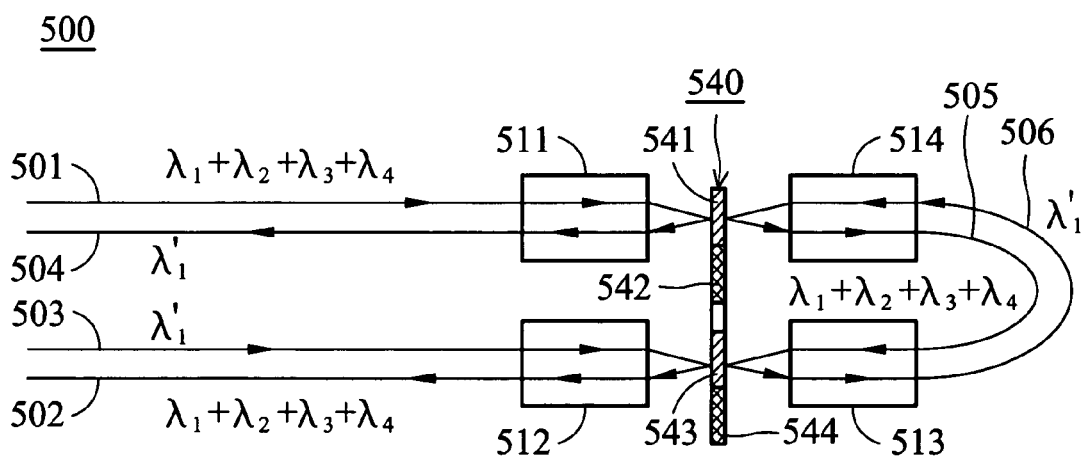
FIG. 5B is a schematic diagram of the selector in FIG. 5A in the "Cross" state.

The wavelength selector of the second embodiment is shown in FIGS. 5A and 5B.

The wavelength selector of the second embodiment has a configuration similar to that of the first embodiment. The wavelength selector 500 includes four dual-fiber collimators 511~514. Two fibers of the collimator 511 form a first input channel 501 (input port) and a second output channel 504 (drop port) for multiple wavelengths. Two fibers of the collimator 512 form a second input channel 503 (add port) and a first output channel 502 (output port) for multiple wavelengths. Furthermore, each fiber of the dual-fiber collimator 513 is fused with one of the fibers of the dual-fiber collimator 514, forming a first connecting channel 505 and a second connecting channel 506. The first input channel 501 is substantially aligned with the second output channel 504 and the first connecting channel 505 by GRIN lenses.

The second input channel 503 is substantially aligned with the first output channel 502 and the second connecting channel 506 by GRIN lenses.

The wavelength selector 500 has a switch member 540 with two filters 542, 544 and two radiation transmissive portions 541, 543. The switch member 540 is disposed between the channels 501~504 and movable between two predetermined positions to redirect the optical paths.

In the second embodiment, the switch member 540 is a small glass plate driven by a step motor for example. The first filter 542 and the second filter 544 are the regions on the glass plate having a wavelength-selecting layer to reflect the radiation of the first and the predetermined wavelength $\lambda_1'$, $\lambda_1$, which are in the same waveband, and pass all of the wavelengths $\lambda_2$~$\lambda_4$ except for the radiation of the first and the predetermined wavelength $\lambda_1'$, $\lambda_1$.

The first radiation transmissive portions 541 and the second radiation transmissive portions 543 are the regions with anti-reflection coatings or through holes to pass any radiation from the input channels 501, 503.

In FIG. 5A, when the switch member 540 is in a first position, the wavelength selector 500 is in the "Bar" state. The wavelengths $\lambda_1$, $\lambda_2$, $\lambda_3$ and $\lambda_4$ carried by the input port 501 reaches the first filter 542, and the radiation of the first wavelength $\lambda_1'$ carried by the add port 503 reaches the second filter 544. The first filter 542 reflects the wavelength $\lambda_1$, which is to be coupled to the drop port 504 by the collimator 511, and passes all of the remaining wavelengths $\lambda_2$, $\lambda_3$, and $\lambda_4$. The remaining wavelengths $\lambda_2$, $\lambda_3$, and $\lambda_4$ are transmitted through the first connecting channel 505 to the collimator 514 and reach the second filter 544, which has the same spectrum characteristic as the first filter 542. At the same time, the second filter 444 reflects the added first wavelength $\lambda_1'$ carried by the add port 503 through the collimator 512 and passes the three remaining wavelengths $\lambda_2$, $\lambda_3$, and $\lambda_4$. Thus, the signals of the first wavelength $\lambda_1'$ and the three wavelengths $\lambda_2$, $\lambda_3$, and $\lambda_4$ are directed to the output port 502 by the collimator 512.

In FIG. 5B, when the switch member 540 is in a second position, the wavelength selector 500 is in the "Cross" state. The input port 501 carries four wavelengths $\lambda_1$, $\lambda_2$, $\lambda_3$, and $\lambda_4$, which are collimated by the GRIN lens of the collimator 511. The wavelengths $\lambda_1$, $\lambda_2$, $\lambda_3$, and $\lambda_4$ pass through the first radiation transmissive portion 541 and are coupled to the collimator 514, entering the first connecting channel 505. The wavelengths $\lambda_1$, $\lambda_2$, $\lambda_3$, and $\lambda_4$ are transmitted through the first connecting channel 505 and collimated by the GRIN lens of the collimator 513. The collimated beam passes through the second radiation transmissive portion 543 and is coupled to the output port 502 through the collimator 512. Meanwhile, radiation in the first wavelength $\lambda_1'$ from the add port 503 also passes through the second radiation transmissive portion 543, entering the second connecting channel 506, and is then collimated by the GRIN lens of the collimator 514. The collimated beam of the first wavelength $\lambda_1'$ passes through the first radiation transmissive portion 541 and is coupled to the drop port 504 by the collimator 511.

Accordingly, when the network connected to the add port 503 and the drop port 504 fails, or data streams from the add port 503 are not critical; the second connecting channel 506 can be eliminated. The dual collimators 513, 514 can be replaced with a dual-fiber collimator with two fused fibers to further reduce the cost.

Moreover, because the input data streams carried by the input port 501 of the wavelength selector 500 are filtered twice by the filters 542, 544, the residual radiation of the wavelength $\lambda_1'$ in the output data streams can be decreased. Accordingly, the wavelength selector 500 offers improved wavelength isolation.

Third Embodiment

Figure 6A:
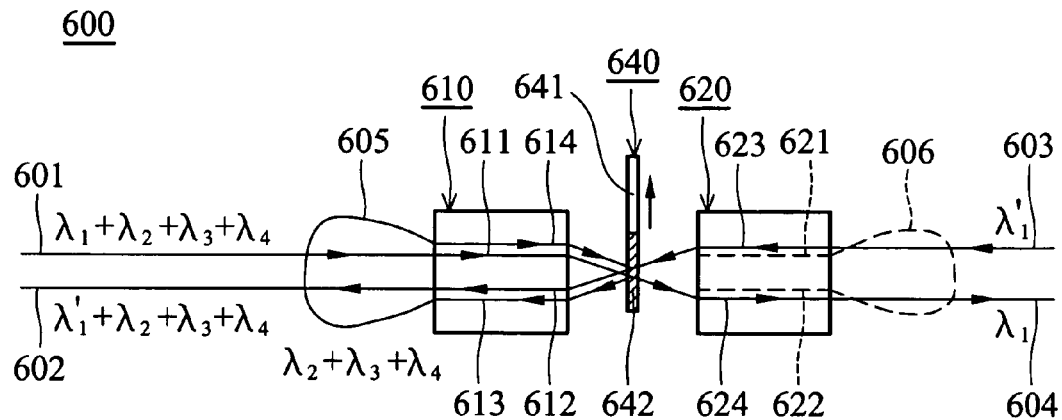
FIG. 6A is a schematic diagram of a wavelength selector in the "Bar" state of the third embodiment of the invention.
Figure 6B:
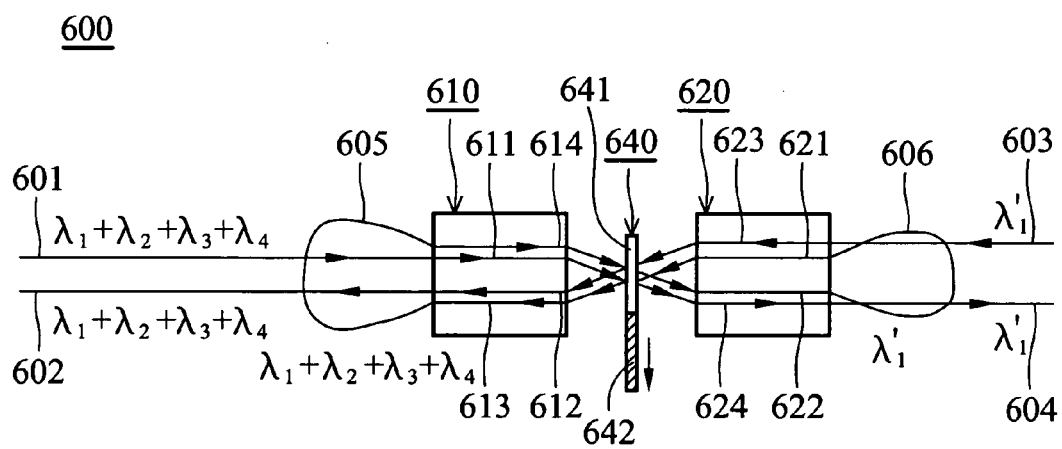
FIG. 6B is a schematic diagram of the selector in FIG. 6A in the "Cross" state.

In order to simplify the configurations of the wavelength selector in the first and second embodiments, the present invention also provides another wavelength selector as shown in FIGS. 6A and 6B. The wavelength selector 600 includes two four-fiber collimators 610 and 620. Two fibers of the collimator 610 form a first input channel 601 (input port) and a first output channel 602 (output port) carrying four wavelengths $\lambda_1$~$\lambda_4$. The two remaining fibers of collimators 610 are fused together, forming a first connecting channel 605. Two fibers of the collimator 620 form a second input channel 603 (add port) and a second output port 604 (drop port) for a first wavelength $\lambda_1'$. The other two fibers of collimators 620 are fused together, forming a second connecting channel 605. Moreover, the first input channel 601 is substantially aligned with the second output channel 604 and the first connecting channel 605 by gradient index (GRIN) lenses. The second input channel 603 is substantially aligned with the first output channel 602 and the second connecting channel 606 by GRIN lenses.

The wavelength selector 600 includes a switch member 640 having a bandpass filter 642 and a mirror 641. The switch member 640 is disposed between the channels 601~604 and movable between two predetermined positions to redirect the optical paths.

In this preferred embodiment, the filter 642 is a bandpass filter with wavelength-selecting layers to pass the radiation of the first and the predetermined wavelength $\lambda_1'$, $\lambda_1$ and reflect all of the wavelengths $\lambda_2$~$\lambda_4$ except for the radiation of the first and the predetermined wavelength $\lambda_1'$, $\lambda_1$. In this case, the predetermined wavelength $\lambda_1$ and the first wavelength $\lambda_1'$ are in the same waveband but different from the wavebands of the other wavelengths $\lambda_2$, $\lambda_3$ and $\lambda_4$. The mirror 641 is used to reflect any introduced radiation from the channels 601~606.

In FIG. 6A, when the switch member 640 is in a first position, the wavelength selector 600 is in the "Bar" state. The wavelengths $\lambda_1$, $\lambda_2$, $\lambda_3$ and $\lambda_4$ carried by the input port 601 and the radiation of the first wavelength $\lambda_1'$ carried by the add port 603 both reach the filter 642. The wavelength $\lambda_1$ passes through the filter 641, which is to be coupled to the drop port 604 by the collimator 624. The remaining wavelengths $\lambda_2$, $\lambda_3$, and $\lambda_4$ are reflected by the filter 642. The three reflected wavelengths $\lambda_2$, $\lambda_3$, and $\lambda_4$ enter the collimator 614, pass through the first connecting channel 605, and again hit the filter 642. At the same time, the filter 642 passes the added first wavelength $\lambda_1'$ carried by the add port 603 through the collimator 620 and reflects the three remaining wavelengths $\lambda_2$, $\lambda_3$, and $\lambda_4$. Thus, the signals of the first wavelength $\lambda_1'$ and the three reflected wavelengths $\lambda_2$, $\lambda_3$, and $\lambda_4$ are coupled to the output port 602 by the collimator 610.

In FIG. 6B, when the switch member 640 is in a second position, the wavelength selector 600 is in the "Cross" state. The input port 601 carries four wavelengths $\lambda_1$, $\lambda_2$, $\lambda_3$, and $\lambda_4$, which are collimated by the GRIN lens of the collimator 610. The wavelengths $\lambda_1$, $\lambda_2$, $\lambda_3$, and $\lambda_4$ are reflected by the mirror 641 and coupled to the collimator 610. All wavelengths $\lambda_1$, $\lambda_2$, $\lambda_3$, and $\lambda_4$ are transmitted through the first connecting channel 405 and collimated to the mirror again. Finally, the four wavelengths $\lambda_1$, $\lambda_2$, $\lambda_3$, and $\lambda_4$ are reflected back to the collimator 612 and coupled to the output port 602. Meanwhile, radiation in the first wavelength $\lambda_1'$ from the add port 603 is reflected by the mirror 641 into the second connecting channel 606 and is then collimated by the GRIN lens of the collimator 622. The collimated beam of the first wavelength $\lambda_1'$ is reflected again and coupled to the drop port 604 by the collimator 624. Therefore, the wavelength selector 600 in the third embodiment of the present invention has completed the Add-Drop functions of the conventional Add-Drop module.

Furthermore, when the network connected to the add port 603 and the drop port 604 fails, or data streams from the add port 603 is not critical; the second connecting channel 606 can be eliminated. The four-fiber collimator 620 can be replaced with a dual-fiber collimator to further reduce the cost.

Figure 6C:
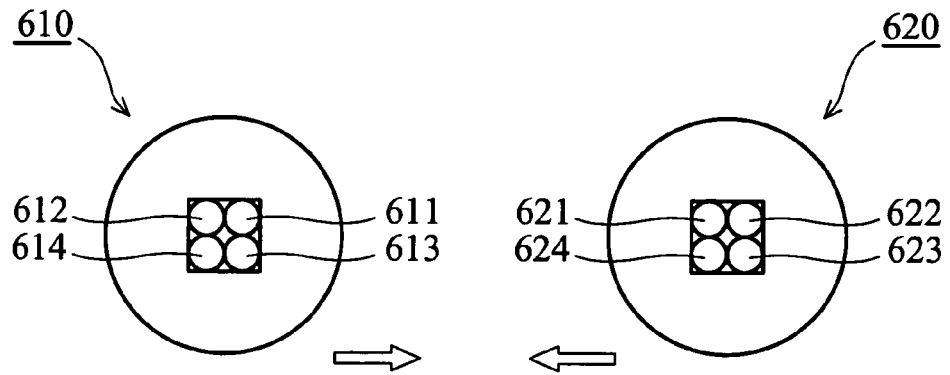
FIG. 6C shows the channel arrangement of the wavelength selector using two four-fiber collimators in the third embodiment.

FIG. 6C is a cross section of the capillaries and the fibers of the four-fiber collimators shown in FIG. 6A. FIG. 6C shows the relative positions of the fibers when the four-fiber collimators 610, 620 face each other. Moreover, the light beam transmitted in each fiber is collimated by the lens in each collimator, such as a GRIN lens or a standard C lens. The collimated light beam can be directed to or reflected to a lens of another collimator, such that the light beam can be coupled to another channel.

Figure 6D:
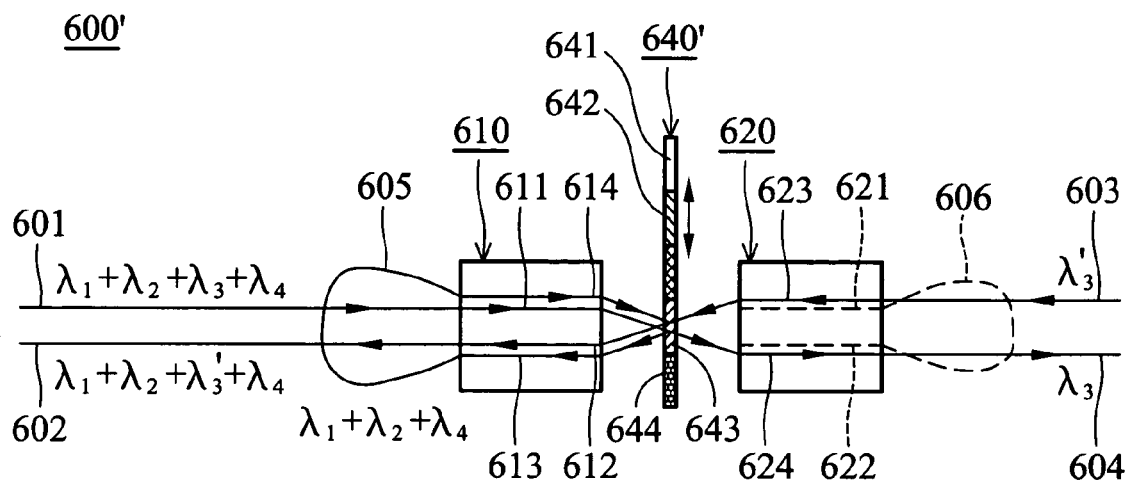
FIG. 6D is a schematic diagram of a multiple wavelength selector of the invention.

Furthermore, another preferred configuration of this embodiment is provided in FIG. 6D. The wavelength selector 600' has a motor-driven switch member 640' with a plurality of bandpass filters 642~644, which have different wavelength selecting spectrums for different wavelengths. When a first communication frequency channel fails, a backup communication channel can be used simply by switching the switch member 640' of the wavelength selector 600' to a second or third position. Accordingly, the product reliability of the present invention is greatly increased.

Fourth Embodiment

Figure 7A:
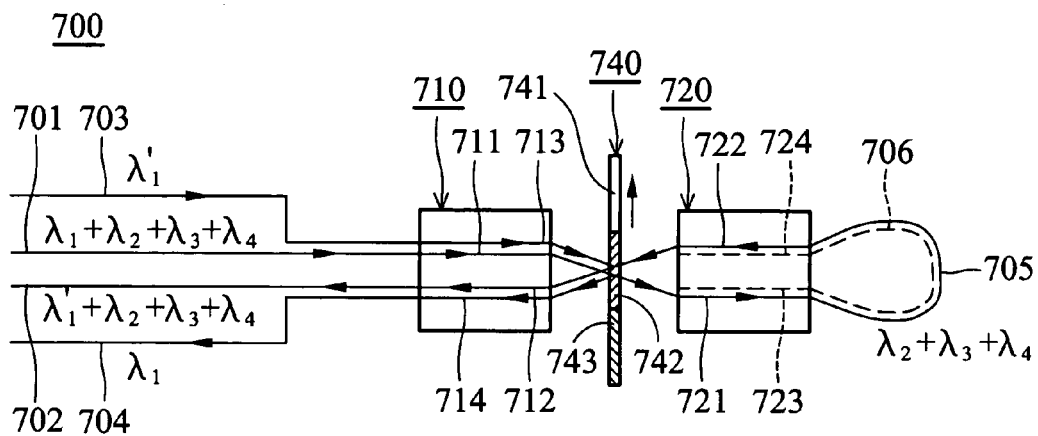
FIG. 7A is a schematic diagram of a wavelength selector in the "Bar" state of the fourth embodiment of the invention.
Figure 7B:
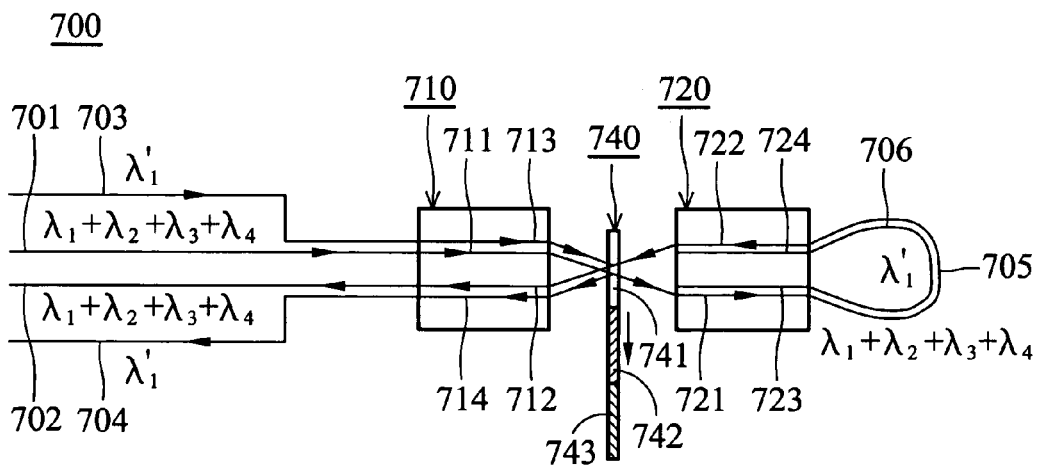
FIG. 7B is a schematic diagram of the selector in FIG. 7A in the "Cross" state.

In order to simplify the configurations of the wavelength selector in the second embodiment, the present invention provides another wavelength selector as shown in FIGS. 7A and 7B. The wavelength selector 700 includes two four-fiber collimators 710 and 720. Two fibers of the collimator 710 form a first input channel 701 (input port) and a first output channel 702 (output port) carrying four wavelengths $\lambda 1~\lambda 4$ for example. The other two fibers of collimators 710 are fused together, forming a first connecting channel 705. Two fibers of the collimator 720 form a second input channel 703 (add port) and a second output port 704 (drop port) for a first wavelength $\lambda 1'$. The two remaining fibers of collimators 720 are fused together, forming a second connecting channel 705. Moreover, the first input channel 701 is substantially aligned with the second output channel 704 and the first connecting channel 705 by gradient index (GRIN) lenses. The second input channel 703 is substantially aligned with the first output channel 702 and the second connecting channel 706 by GRIN lenses.

The wavelength selector 700 includes a switch member 740 having a radiation transmissive portion 741 and two bandpass filters 742 and 743. The switch member 740 is disposed between the channels 701~704 and movable between two predetermined positions to redirect the optical paths.

In the fourth embodiment, the filter 742 is a bandpass filter with wavelength-selecting layers to reflect the radiation of the first and the predetermined wavelength $\lambda_1'$, $\lambda_1$ and pass all of the wavelengths $\lambda_2~\lambda_4$ except for the radiation of the first and the predetermined wavelength $\lambda_1'$, $\lambda_1$. In this case, the predetermined wavelength $\lambda_1$ and the first wavelength $\lambda_1'$ are in the same waveband but different from the wavebands of the other wavelengths $\lambda_2$, $\lambda_3$ and $\lambda_4$. The radiation transmissive portion 741 is a region having with anti-reflective coating or a through hole to pass any radiation from the channels 701~706.

In FIG. 7A, when the switch member 740 is in a first position, the wavelength selector 700 is in the "Bar" state. The wavelengths $\lambda_1$, $\lambda_2$, $\lambda_3$ and $\lambda_4$ carried by the input port 701 and the radiation of the first wavelength $\lambda_1'$ carried by the add port 703 both reach the filter 742. The filter 742 reflects the wavelength $\lambda_1$, which is to be coupled to the drop port 704 by the collimator 720, and passes all of the remaining wavelengths $\lambda_2$, $\lambda_3$, and $\lambda_4$. The three remaining wavelengths $\lambda_2$, $\lambda_3$, and $\lambda_4$ enter the collimator 721 through the first connecting channel 705 and again hit the filter 742. At the same time, the filter 742 reflects the added first wavelength $\lambda_1'$ carried by the add port 703 through the collimator 713 and passes the three remaining wavelengths $\lambda_2$, $\lambda_3$, and $\lambda_4$. Thus, the signals of the first wavelength $\lambda_1'$ and the three remaining wavelengths $\lambda_2$, $\lambda_3$, and $\lambda_4$ are coupled to the output port 702 by the collimator 712.

In FIG. 7B, when the switch member 740 is in a second position, the wavelength selector 700 is in the "Cross" state. The input port 701 carries four wavelengths $\lambda_1$, $\lambda_2$, $\lambda_3$, and $\lambda_4$, which are collimated by the GRIN lens of the collimator 711. The wavelengths $\lambda_1$, $\lambda_2$, $\lambda_3$, and $\lambda_4$ pass through the radiation transmissive portion 741, enter the first connecting channel 705, and return to the collimator 721, and later couple to the output port 702. Similarly, radiation in the first wavelength $\lambda_1'$ from the add port 703 pass through the radiation transmissive portion 741, entering the second connecting channel 706, and return to the collimator 714, and couple to the drop port 704. Therefore, the wavelength selector 700 in the third embodiment of the present invention has completed the Add-Drop functions of the conventional Add-Drop module.

Furthermore, when the network connected to the add port 703 and the drop port 704 fails, or data streams from the add port 703 are not critical; the second connecting channel 706 can be eliminated. The four-fiber collimator 720 can be replaced with a dual-fiber collimator to further reduce the cost.

Figure 7C:
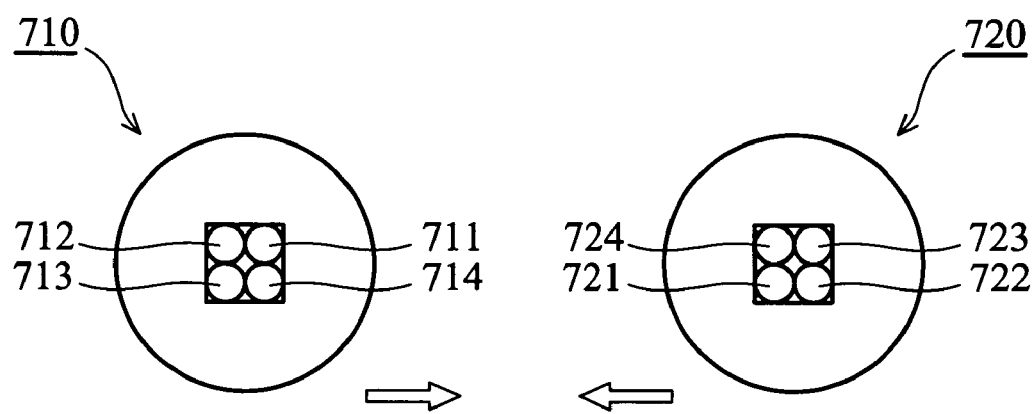
FIG. 7C shows the channel arrangement of the wavelength selector using two four-fiber collimators in the fourth embodiment.

FIG. 7C is a cross section of the capillaries and the fibers of the four-fiber collimators shown in FIG. 7A. FIG. 6C shows the relative positions of the fibers when the four-fiber collimators 710, 720 face to each other.

Furthermore, a switch member has a second filter 743 with another wavelength selective spectrum. When a first communication frequency channel fails, a backup communication channel can be used simply by switching the position of the switch member to increase the reliability of the wavelength selector.

Moreover, the four-fiber collimators used in the third and fourth embodiment can be replaced with dual-fiber collimators. The switch members in the third and fourth embodiment have fewer filters or coatings than those in the first and second embodiment, such that the switch member can be more easily fabricated. Additionally, the wavelength selectors with four-fiber collimators can be more easily assembled than in the first and second embodiments.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for transmitting radiation of multiple wavelengths, comprising:
   a first input channel carrying radiation of one or more wavelengths;
   a first output channel;
   a second input channel carrying radiation of a first wavelength to be added;
   a second output channel for receiving radiation of at least one wavelength that is to be dropped; and
   a switch member having a plurality of filters, wherein the switch member is movable among a plurality of positions;
   a first connecting channel, wherein when the switch member is in a first position, the radiation carried by the first input channel and the second input channel reaches a first filter, the first filter passes radiation of a predetermined wavelength in the radiation carried by the first input channel to the second output channel and reflects the remaining wavelengths through the first connecting channel, reaching the first filter and reflected again, the reflected radiation of the remaining wavelengths and the radiation of the first wavelength passing through the first filter are received by the first output channel.

2. The apparatus as claimed in claim 1, wherein the predetermined wavelength and the first wavelength are in the same waveband, but are different from the wavebands of the other wavelengths in the radiation carried by the first input channel.

3. The apparatus as claimed in claim 1, wherein the first input channel is substantially aligned with the second output channel, and the second input channel is substantially aligned with the first output channel.

4. The apparatus as claimed in claim 1, wherein the first input channel is substantially aligned with the first connecting channel, and the first connecting channel is substantially aligned with the first output channel.

5. The apparatus as claimed in claim 1, wherein the first filter passes the radiation of the first and the predetermined wavelength and reflects all of the wavelengths except for the radiation of the first and the predetermined wavelength.

6. The apparatus as claimed in claim 1, wherein the switch member has a radiation reflective portion, when the switch member is in a second position, the radiation carried by the first input channel is reflected into the first connecting channel by the radiation reflective portion, the radiation passing through the first connecting channel reaches the radiation reflective portion and is reflected into the first output channel.

7. The apparatus as claimed in claim 6, further comprising a second connecting channel, wherein when the switch member is in the second position, the radiation of the first wavelength carried by the second input channel is reflected into the second connecting channel by the radiation reflective portion, the radiation passing through the second connecting channel reaches the radiation reflective portion again, reflected into second output channel.

8. The apparatus as claimed in claim 7, wherein the second input channel is substantially aligned with the second connecting channel, and the second connecting channel is substantially aligned with the second output channel.

9. The apparatus as claimed in claim 6, wherein the first input channel, the first output channel and the first connecting channel are formed by a four-fiber collimator, the first connecting channel is formed by two fused fibers of the four-fiber collimator.

* * * * *